United States Patent
Behnen et al.

(10) Patent No.: US 10,606,839 B2
(45) Date of Patent: *Mar. 31, 2020

(54) PREVENTING STALENESS IN QUERY RESULTS WHEN USING ASYNCHRONOUSLY UPDATED INDEXES

(71) Applicant: International Business Machines Corporation, Armonk, NY (US)

(72) Inventors: Marion E. Behnen, Austin, TX (US); Joern Klauke, Petersberg (DE); Jens P. Seifert, Gaertringen (DE); Calisto P. Zuzarte, Pickering (CA)

(73) Assignee: International Business Machines Corporation, Armonk, NY (US)

( * ) Notice: Subject to any disclaimer, the term of this patent is extended or adjusted under 35 U.S.C. 154(b) by 282 days.

This patent is subject to a terminal disclaimer.

(21) Appl. No.: 15/602,159

(22) Filed: May 23, 2017

(65) Prior Publication Data

US 2017/0255677 A1    Sep. 7, 2017

Related U.S. Application Data

(63) Continuation of application No. 14/923,818, filed on Oct. 27, 2015.

(51) Int. Cl.
*G06F 16/2455* (2019.01)
*G06F 16/28* (2019.01)
*G06F 16/23* (2019.01)

(52) U.S. Cl.
CPC ...... *G06F 16/2456* (2019.01); *G06F 16/2379* (2019.01); *G06F 16/2455* (2019.01); *G06F 16/24558* (2019.01); *G06F 16/284* (2019.01)

(58) Field of Classification Search
CPC ............... G06F 16/2456; G06F 16/284; G06F 16/24558; G06F 16/2455; G06F 16/2379
(Continued)

(56) References Cited

U.S. PATENT DOCUMENTS 8,140,495 B2    3/2012  Carlin et al.
8,239,389 B2    8/2012  Zagelow et al.
(Continued)

FOREIGN PATENT DOCUMENTS

CN          101650741 B    2/2011

OTHER PUBLICATIONS

Behnen et al., "Preventing Staleness in Query Results When Using Asynchronously Updated Indexes", U.S. Appl. No. 14/923,818, filed Oct. 27, 2015, 25 pages.
(Continued)

*Primary Examiner* — Cam Y T Truong
(74) *Attorney, Agent, or Firm* — Edward J. Wixted, III

(57) ABSTRACT

A method, computer program product, and computer system for optimizing query processing is provided. An asynchronously updated index is provided for a main dataset. A time-sequences log of data modifications to the main dataset is provided. A query of the main dataset is received. The main dataset is joined with the time-sequenced log data resulting in a first intermediate result. The query is processed by keeping one or more entries satisfying the query by emulating a function of the asynchronously updated index resulting in a second intermediate result. Updated, deleted dataset entries are deleted from the asynchronously updated index. The query is processed resulting in a third intermediate result. A union of the second intermediate result and third intermediate result is built defining a final result.

4 Claims, 6 Drawing Sheets

(58) Field of Classification Search
USPC .......................................................... 707/714
See application file for complete search history.

(56) References Cited

U.S. PATENT DOCUMENTS

| | | |
|---|---|---|
| 2006/0080345 A1 | 4/2006 | Murthy et al. |
| 2007/0073657 A1 | 3/2007 | Santosusso |
| 2008/0249983 A1* | 10/2008 | Meisels .............. G01C 21/3476 |
| 2008/0249990 A1 | 10/2008 | Baby et al. |
| 2009/0210429 A1 | 8/2009 | Agrawal et al. |
| 2012/0016881 A1 | 1/2012 | Hrle et al. |
| 2012/0259824 A1 | 10/2012 | Zagelow et al. |
| 2014/0095467 A1 | 4/2014 | Bueche et al. |
| 2014/0279855 A1* | 9/2014 | Tan ..................... G06F 16/2228 |
| | | 707/609 |
| 2015/0331910 A1 | 11/2015 | Srinivasan et al. |

OTHER PUBLICATIONS

IBM, List of Patent Applications Treated as Related, Appendix P, Dated May 23, 2017, 2 pages.

"Asynchronous index updates", IBM Knowledge Center, DB2 Version 10.1 for Linux, UNIX, and Windows, 1 page, <http://www-01.ibm.com/support/knowledgecenter/SSEPGG_10.1.0/com.ibm.db2.luw.admin.ts.doc/doc/c_asynchronousindexing.html>, May 23, 2017.

* cited by examiner 202 base table

| ID (PK) | firstname | lastname |
|---|---|---|
| 1 | Joern | Mueller |
| 2 | Johannes | Meier |
| 4 | Joseph | Schulze |

204 index

| firstname | ID (PK) |
|---|---|
| Joern | 1 |
| Johannes | 2 |
| Joseph | 4 |

FIG. 2

202 base table

| ID (PK) | firstname | lastname |
|---|---|---|
| 1 | Joern | Mueller |
| 2 | Jens | Meier |
| 3 | John | Smith |

204 index

| firstname | ID (PK) |
|---|---|
| Joern | 1 |
| Johannes | 2 |
| Joseph | 4 |

302 staging table

| ID (PK) | operation |
|---|---|
| 2 | update |
| 3 | insert |
| 4 | delete |

FIG. 3

PREVENTING STALENESS IN QUERY RESULTS WHEN USING ASYNCHRONOUSLY UPDATED INDEXES

FIELD OF THE INVENTION

The invention relates generally to query optimization in a database, and more specifically, to optimizing query processing in a database system having a plurality of datasets and asynchronously updated indexes.

BACKGROUND

Relational databases build the backbone of many enterprise applications. Due to growing data volumes and data complexity, continued efforts have been made to improve response times of queries of relational databases. Data complexity can include managing dependencies between individual datasets, managing semi-structured data in relational databases, and increasing performance expectations of users of enterprise applications. One of the early introduced performance optimization strategies is based on indexes of tables on datasets of the database. Different types of indexes have been introduced. Typically, indexes are updated synchronously with a main or base table as part of a transaction that modifies the data in the main dataset. However, in special cases, e.g., in the case of a text search index, updates may require resource-intensive steps that would unduly prolong transaction times. Depending on the size of documents and the additional processing, some systems therefore use an asynchronously update mode for text indexes.

Asynchronous updates provide the advantages of modifying the data faster, response times are therefore shorter and the data is visible sooner for other applications. However, to refresh the text search index, the modified data must be logged. Until the logged data is applied to the text index, query results will reflect the state of the data from the last update time, and queries served from such an index may therefore return stale data.

SUMMARY

According to one embodiment of the present invention, a method for optimizing query processing in a database system comprising a plurality of datasets is provided. The method includes providing, by one or more processors, an asynchronously updated index for a main dataset in a database system; providing, by one or more processors, a time-sequenced log data of modifications to the main dataset, wherein the log data of modifications includes at least one of (i) an addition, (ii) an update and (iii) a deletion of affected entries of the main dataset after a cutoff time of a last asynchronous index update; receiving, by one or more processors, a query of the main dataset; joining, by one or more processors, the main dataset with the time-sequenced log data resulting in a first intermediate result comprising one or more entry of the main dataset after the cutoff time, wherein the one or more entry is at least one of (i) inserted, (ii) updated, and (iii) deleted; processing, the one or more processors, the query by keeping the one or more entries satisfying the query by emulating a function of the asynchronously updated index access resulting in a second intermediate result; filtering, by one or more processors, at least one of (i) an out updated dataset entry and (ii) a deleted dataset entry from the asynchronously updated index using the time-sequenced log data building a lookup table; processing, by one or more processors, the query against the base table using the lookup table resulting in a third intermediate result; and building, by one or more processors, a union of the second intermediate result and the third intermediate result defining a final result of the query.

According to another embodiment of the present invention, a computer program product for optimizing query processing in a database system comprising a plurality of datasets is provided. The computer program product comprises a computer readable storage medium and program instructions stored on the computer readable storage medium. The program instructions include program instructions to provide an asynchronously updated index for a main dataset in a database system; program instructions to provide a time-sequenced log data of modifications to the main dataset, wherein the log data of modifications includes at least one of (i) an addition, (ii) an update and (iii) a deletion of affected entries of the main dataset after a cutoff time of a last asynchronous index update; program instructions to receive a query of the main dataset; program instructions to join the main dataset with the time-sequenced log data resulting in a first intermediate result comprising one or more entry of the main dataset after the cutoff time, wherein the one or more entry is at least one of (i) inserted, (ii) updated, and (iii) deleted; program instructions to program instructions to process the query by keeping the one or more entries satisfying the query by emulating a function of the asynchronously updated index access resulting in a second intermediate result; program instructions to filter at least one of (i) an out updated dataset entry and (ii) a deleted dataset entry from the asynchronously updated index using the time-sequenced log data building a lookup table; program instructions to process the query against the base table using the lookup table resulting in a third intermediate result; and program instructions to build a union of the second intermediate result and the third intermediate result defining a final result of the query.

According to another embodiment of the present invention, a computer system for optimizing query processing in a database system comprising a plurality of datasets is provided. The computer system includes one or more computer processors, one or more computer readable storage media, and program instructions stored on the computer readable storage media for execution by at least one of the one or more processors. The program instructions include program instructions to program instructions to provide an asynchronously updated index for a main dataset in a database system; program instructions to provide a time-sequenced log data of modifications to the main dataset, wherein the log data of modifications includes at least one of (i) an addition, (ii) an update and (iii) a deletion of affected entries of the main dataset after a cutoff time of a last asynchronous index update; program instructions to receive a query of the main dataset; program instructions to join the main dataset with the time-sequenced log data resulting in a first intermediate result comprising one or more entry of the main dataset after the cutoff time, wherein the one or more entry is at least one of (i) inserted, (ii) updated, and (iii) deleted; program instructions to program instructions to process the query by keeping the one or more entries satisfying the query by emulating a function of the asynchronously updated index access resulting in a second intermediate result; program instructions to filter at least one of (i) an out updated dataset entry and (ii) a deleted dataset entry from the asynchronously updated index using the time-sequenced log data building a lookup table; program instructions to process the query against the base table using the lookup table resulting in a third intermediate result; and program instructions to build a union of the second intermediate result and the third intermediate result defining a final result of the query.

BRIEF DESCRIPTION OF THE SEVERAL VIEWS OF THE DRAWINGS

FIG. 2 is a block diagram of a small base table and a related asynchronously updated index, in accordance with an embodiment of the present invention;

FIG. 3 is a block diagram of a base table, an asynchronously updated index and a staging table, in accordance with an embodiment of the present invention;

DETAILED DESCRIPTION

Figure 1:
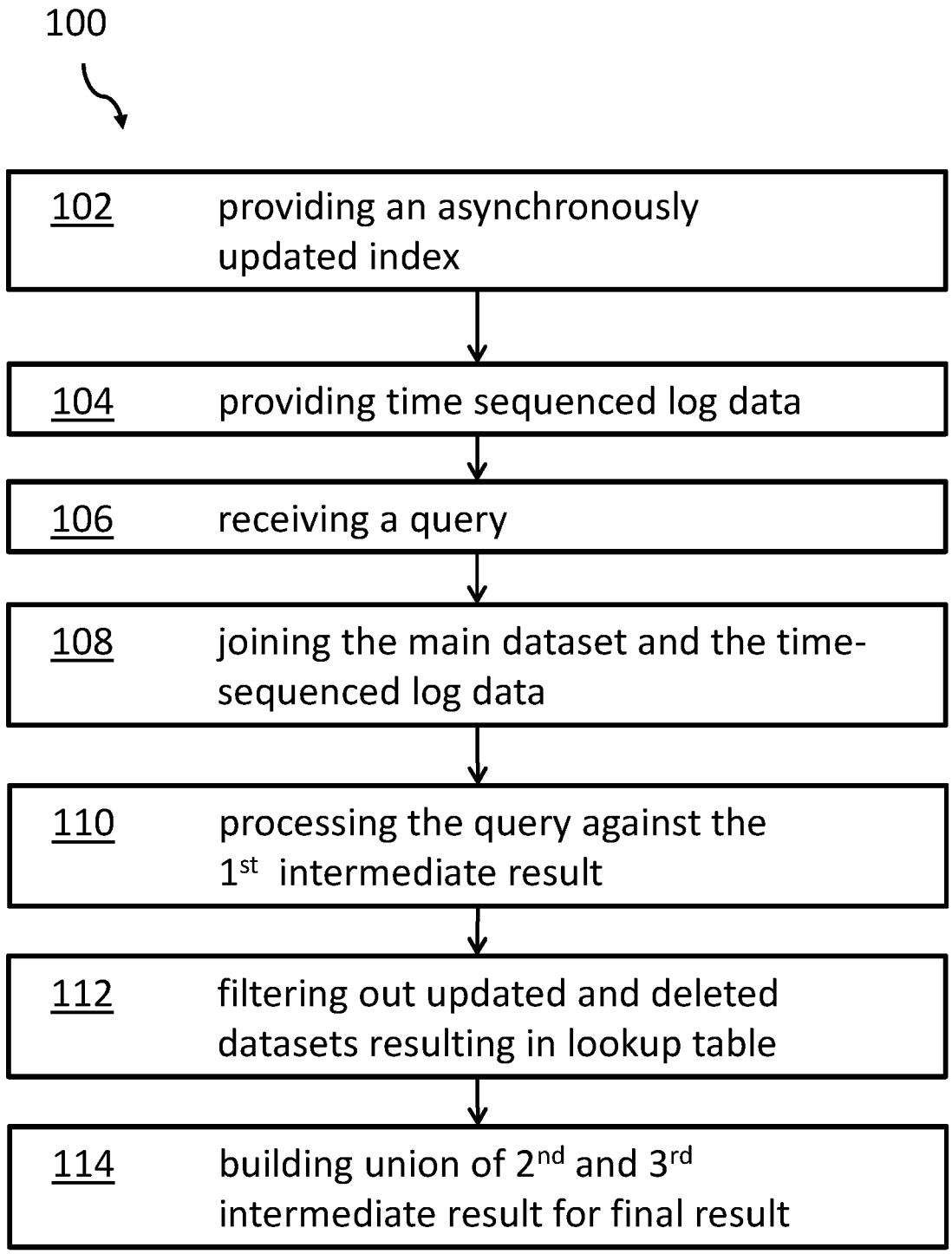
FIG. 1 is a flowchart depicting operations for optimizing query processing in a database system having a plurality of datasets and asynchronously updated indexes, in accordance with an embodiment of the present invention.

In the context of this description, the following conventions, terms and/or expressions may be used:

The term 'query processing' may generally denote transactions and/or operations against a part of a database system, e.g., a relational database system.

The term 'dataset' may denote a structured, semi-structured or unstructured set of data, including, e.g., a relational database table. Both expressions may be used synonymously in this description.

The term 'relational database' may denote a digital database storing data whose organization is based on the relational model of data. This model may organize data into one or more tables—or "relations"—of rows and columns, with a unique key for each row. Generally, each entity type described in a database may have its own table, the rows representing instances of that type of entity and the columns representing values attributed to that instance. Because each row in a table has its own unique key, rows in a table may be linked to rows in other tables by storing the unique key of the row to which it should be linked (where such unique key is known as a "foreign key").

The term 'asynchronously updated index' may denote an index relating to a main dataset which—for performance reasons—may not be updated synchronously with the transaction of the main dataset. Instead, the asynchronously updated index may be brought in line with the main dataset at different times if compared to the transaction times of the main dataset. In some examples, updating the asynchronously updated index may take much more time than the transaction itself, slowing down query processing against the main dataset. Consequently, an update of the asynchronously updated index relating to a main dataset may be performed at different times—and potentially for a series of index updates—than a transaction of the main dataset.

The term 'time-sequenced log data'—or staging table—may denote data about changes—i.e., inserts, updates, deletions—to the asynchronously updated index relating to a main dataset at times when the index may not be in line with the underlying main dataset. This information may be used for a query optimization against a main dataset when the asynchronously updated index may not be synchronized with the underlying main dataset. Thus, when using an asynchronously updated index, a query against the main dataset may not return stale data but, instead, correct and up-to-date query results.

The term 'asynchronous index update' may denote a process of bringing the asynchronously updated index in line with the underlying main dataset. This may be performed at a later point in time compared to the time one or more modifying transactions have been executed against the main dataset. A cutoff time of a last asynchronous index update may denote the time at which the main dataset and the related asynchronously updated index are completely aligned.

The term 'asynchronously updated index access' may denote an access to the main dataset using the asynchronously updated index for an access with a primary key.

The term 'query' may denote a defined request for information retrieval or modifying transaction from or of a database and/or information systems. A query language—e.g., SQL (structured query language)—may be used to define a query.

The term 'text search index' may denote a special form of an index for a table or dataset in a relational database applying linguistic processing to match query predicates against structured semi-structured or unstructured data. Synonyms of query predicates may also be used to generate query results.

The proposed method for optimizing query processing in a database system comprising a plurality of datasets may offer a couple of advantages and technical effects:

An embodiment of the present invention recognize that asynchronously updated indexes in a database, e.g., a relational database, can cause stale data. An embodiment of the present invention provides operations to minimize stale data. In some embodiments, stale data is minimized by synchronizing the index together with the base or main dataset. In some embodiments, to avoid a slowdown of the transaction from index updates and still benefit from the performance optimization of an index, and to address the stale data and query results supported by an asynchronously updated index, embodiments of the present invention use time-sequenced log data, (e.g., in a staging table) to generate correct query results. In some embodiments, queries against the main dataset return results reflecting the actual status of the main dataset, even for asynchronously updated indexes which have not been updated immediately before the query execution and which are therefore not completely synchronized with the main dataset. In some embodiments, a query against the main dataset will not return stale data even when an asynchronously updated index to the main dataset has not yet been synchronized with the main dataset.

The present disclosure will now be described in detail with reference to the Figures. FIG. 1 is a flowchart depicting operations for optimizing query processing in a database system having a plurality of datasets and asynchronously updated indexes, in accordance with an embodiment of the present invention.

In some embodiments, the whole query transformation may be done by an SQL optimizer transparent to an end user or application. For example, the end user may issue a query like the following against a base table: SELECT firstname, lastname FROM basetable WHERE CONTAINS(firstname, 'Josef')=1.

FIG. 1 shows a block diagram of an embodiment of operations 100 for optimizing query processing in a database system comprising multiple datasets and asynchronously updated indexes. Operations 100 include providing an asynchronously updated index for a main dataset in the database system (step 102). A time-sequenced log data (e.g., a staging table) of modifications to the main dataset is provided (step 104). In some embodiments, the log data of modifications may be indicative of additions, updates and deletions of affected entries (e.g., by a modifying transaction) of the main dataset after a cutoff time of a last asynchronous index update. This last asynchronous index update may have been done at a different point in time than the last transaction to the related main dataset. In step 106, a query is received against the main dataset.

In step 108, the main dataset is joined with the time-sequenced log data resulting in a first intermediate result comprising inserted and modified entries of the main dataset after the cutoff time.

In step 110, the query is processed against the first intermediate result by keeping entries satisfying the query by emulating a function of an asynchronously updated index access resulting in a second intermediate result. In some embodiments, the first intermediate result may deliver the same query results as if the query would have been performed with an asynchronously updated index. In some embodiments, there is an additional processing cost to achieve up-to-date results using the emulated function compared with the use of an asynchronously updated index.

In step 112, updated and deleted dataset entries are filtered from the asynchronously updated index using the time-sequenced log data or staging table building a lookup table. The query is processed against the base table using the lookup table as index table resulting in a third intermediate result.

In step 114, a final result is generated by building a union of the second intermediate result and the third intermediate result.

According to one embodiment of the present invention, the time-sequenced log data is read only once by the database system for (a) joining the main dataset with the time-sequenced log data and (b) filtering out updated and deleted dataset entries from the asynchronously updated index. Thus, only one physical access to the disk or cache may be required. In some embodiments, depending on the time when the staging table is again synchronized with the main dataset, the number of entries in the staging table might be relatively small if compared to the size of the main dataset.

According to one embodiment, the database system is a relational database system, overcoming the disadvantages of using asynchronously updated indexes (e.g., text search indexes) in a relational database. In some embodiments, the data set may be a table in a relational database system. For example, the data set can be a collection in a NoSQL database or other data container supporting indexing functionality.

According to one embodiment, a query optimizer may perform operations 100. In some embodiments, the query optimizer uses system-defined or user-defined criteria (e.g., a database configuration setting) or a query property that lets users accept staleness for a particular query. In some embodiments, the query optimizer determines whether operations 100 are applied when performing queries that rely on asynchronously updated indexes.

According to one embodiment, an asynchronously updated index is used for performance optimization purposes during insert and/or update operations to the main dataset. In some embodiments, updating the asynchronously updated index together with the main dataset during a transaction results in slowing down the main transaction. For example, the update of the asynchronously updated index may take a significant amount of time and may be resource intensive due to relatively complex operations (e.g., the complete text search index may be reorganized).

According to one embodiment, the asynchronously updated index is a text search index. Full text search indexes allow a full text search by, for example, indexing the words contained in a document and associating the indexed words with a reference to the document. Subsequently, searches for a Boolean phrase using operators 'and', 'or', 'not' and 'braces' may be matched against the index to locate documents comprising the words in the phrase. In some embodiments, databases also support search capabilities, like fuzzy search, proximity, or synonyms.

According to one embodiment, the asynchronously updated index is a spatial index. Spatial indexes map multi-dimensional location data into a format that supports spatial relations queries.

According to another embodiment, the asynchronously updated index is an image index. Here, expressions like "retrieve something similar to a reference image" may be possible. In some embodiments, such similarity searches may be enhanced in its performance when asynchronously updated indexes are used.

In a further embodiment, the processing of a query against a main dataset may also include determining whether stale query results are acceptable.

FIG. 2 is a block diagram of a small base table and a related asynchronously updated index, in accordance with an embodiment of the present invention. FIG. 2 shows a block diagram of an embodiment of base table 202 and asynchronously updated index table 204. As a simple example for texts, base table 202 includes first names and related last names. Additionally, one column is reserved as a key column with an identifier ID which, in some embodiments, serves as a unique primary key (PK). Related asynchronously updated index 204 includes two columns, one for the first name and one for the primary key of base table 202. It may be noted that the text comprising columns of base table 202 is only an example, other examples may potentially include much longer texts. It may further be noted that other examples of base table 202 and asynchronously updated index 204 may each include a greater number or fewer rows and/or columns. In FIG. 2, base table 202 and asynchronously updated index 204 are shown at a time when the two are synchronized.

FIG. 3 is a block diagram of a base table, an asynchronously updated index and a staging table, in accordance with an embodiment of the present invention. FIG. 3 shows a block diagram of an embodiment of base table 202, asynchronously updated index table 204 and the time-sequenced log data or staging table 302. The tables 202, 204 and 302 may in this status after a couple of updates, delete and insert operations when starting from the situation as defined in FIG. 2. For example, the first name in the row 2 with ID=2 was updated from "Johannes" to "Jens," the row with primary key 3 was inserted, and the row with a primary key equal to 4 was deleted. Querying asynchronously updated index 204 would return the same result as before—in the situation of FIG. 2—which is clearly outdated. The result would show the name "Johannes", which no longer exists, and "John" is missing. In a relational scenario with an internal join to retrieve the relevant document, the document comprising "Joseph" may either be eliminated if the unit document identifier is not available or, if the document identifier has been re-used, the newly inserted document may be shown as part of the results, independent of its content. Thus, a query would result in stale or outdated data.

Thus, staging table 302 is advantageously used. Staging table 302 logs changes or modifications to asynchronously updated index 204. As can be seen, the entry with primary key 1 in base table 202 has not been changed compared to the example in FIG. 2. Thus, staging table 302 may not have an entry regarding primary key 1. However, staging table 302 reflects the change from "Johannes" to "Jens" as an update operation. Additionally, staging table 302 has logged a new entry to base table 202 with the primary key of "3" and indicates that the entry with the primary key "4" in base table 202 has been deleted. Thus, by using staging table 302 together with asynchronously updated index table 204, a correct result of a query against base table 202 may be reconstructed.

Figure 4:
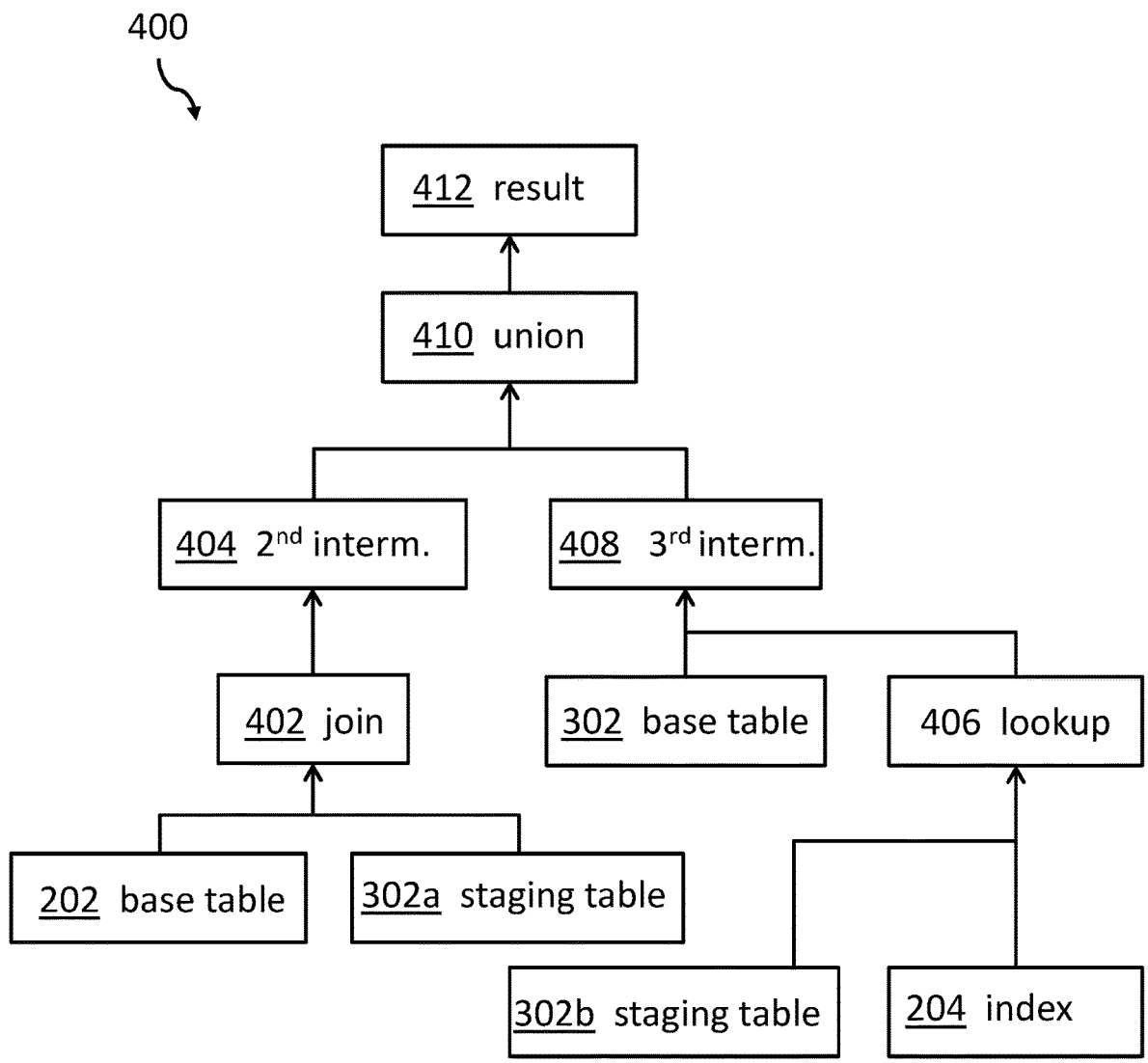
FIG. 4 is a block diagram depicting execution and determination of a dataset and intermediate query results, in accordance with an embodiment of the present invention.

FIG. 4 is a block diagram depicting execution and determination of a dataset and intermediate query results, in accordance with an embodiment of the present invention. FIG. 4 shows a block diagram 400 of involved tables and intermediate results in a query using an asynchronously updated index as well as operations performed to the data. If a query is received, a query processor may spawn at least 2 processes which may be executed in parallel. The lower left side of FIG. 4 may represent one of the two processes (i.e., base table 202 and staging table 302a), whereas the lower right side of FIG. 4 may represent the second process (i.e., index 204 and staging table 302b).

Firstly, base table 202 may be joined (step 402) with staging table 302a. In some embodiments, this results in a first intermediate result. Step 402 may include inserted and modified entries of the main dataset or base table 202 after a point in time (e.g., the last update of the time-sequenced log data or last asynchronous index update). Thus, changes which have been performed to the base data set of base table 202 may be reflected here. Next, the query may be executed against the first intermediate result by emulating a function of the asynchronously updated index access. In some embodiments, this results in second intermediate result 404. Thus, second intermediate result 404 may include inserted and updated entries of base table 202 which may not have been retrieved by the query using an outdated asynchronously updated index 204.

As a parallel process, a filtering may be performed to filter out updated and deleted dataset entries from asynchronously updated index 204 using staging table 302b. In some embodiments, this results in lookup table 406. The query may then be executed against base table 202 using lookup table 406. In some embodiments, modified and deleted entries of index table 204 are reflected in lookup table 406. The result is seen as third intermediate result 408.

In some embodiments, to determine final result 412 of the query, union 410 is built between second intermediate result 404 and third intermediate result 408.

Figure 5:
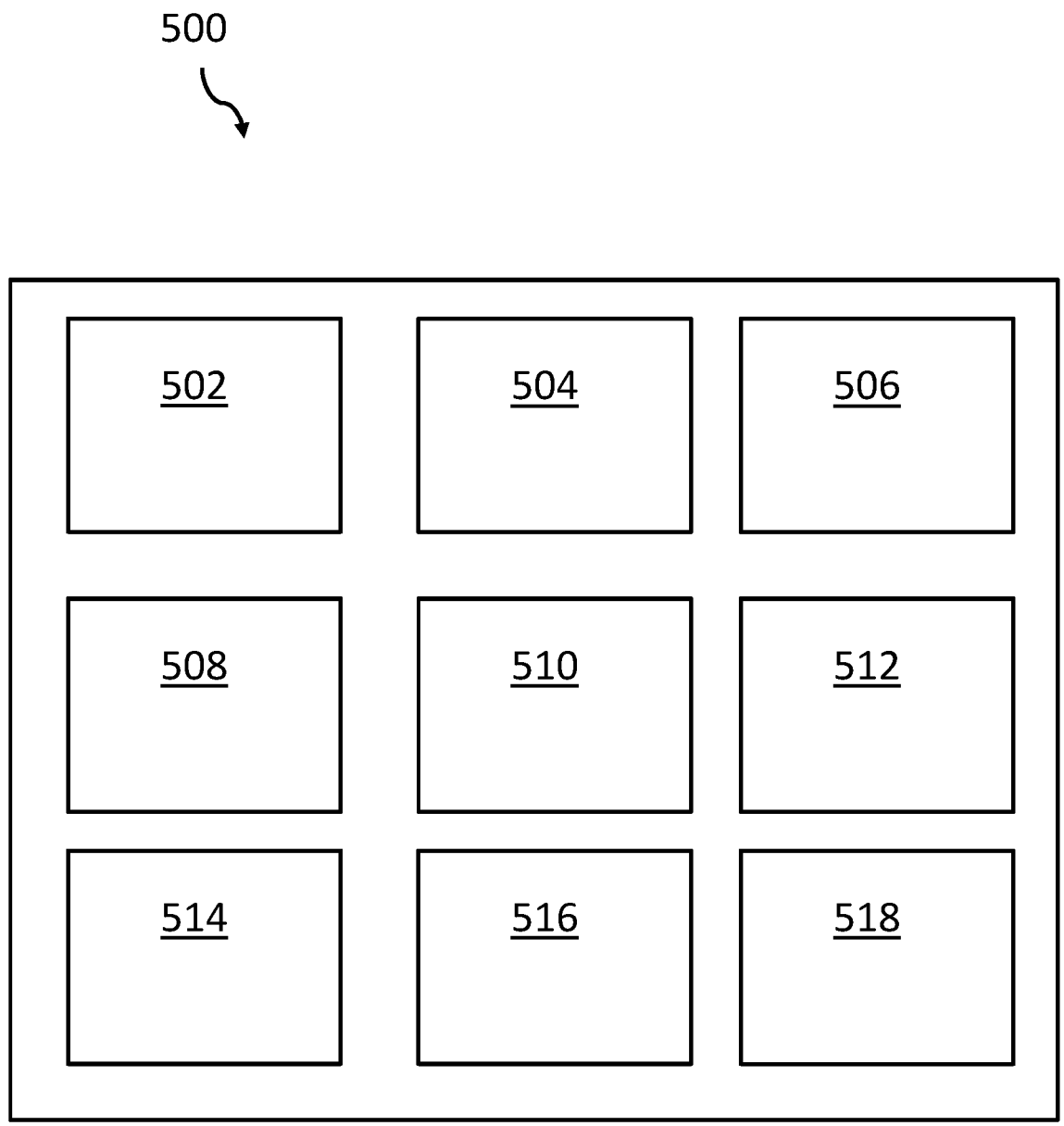
FIG. 5 is a functional block diagram illustrating components of a database system, in accordance with an embodiment of the present invention.

FIG. 5 is a functional block diagram illustrating components of a database system, in accordance with an embodiment of the present invention. FIG. 5 shows a block diagram of an embodiment of the inventive database system 500 for optimizing query processing comprising a plurality of datasets. Database system 500 includes processor 502 and memory 504 communicatively coupled to processor 502. Database system 500 may also include first storage 506 for storing asynchronously updated index 204 for main dataset 202 in database system 500. Additionally, database system 500 includes second storage 508 for storing log data 302 of modifications to main dataset 202. Time-sequenced log data 302 of modifications may be indicative of additions, updates, and deletions—thus, modifying transactions—of affected entries of main dataset 202 after a cutoff time of a last asynchronous index update. Moreover, database system 500 may include a receiving unit 510 adapted for receiving a query against main dataset 202 and join unit 512 adapted for joining main dataset 202 with time-sequenced log data 302 resulting in a first intermediate result. In some embodiments, the first intermediate result includes inserted and modified entries of main dataset 202 after the cutoff time.

In some embodiments, database system 500 includes processing unit 514 adapted for processing the query against the first intermediate result by keeping entries satisfying the query by emulating a function of the asynchronously updated index access resulting in second intermediate result 404. In some embodiments, database system 500 includes filtering unit 516 adapted for filtering out updated and deleted dataset entries from asynchronously updated index 204 using time-sequenced log data 302 building lookup table 406.

In some embodiments, processor 502 is adapted for processing the query against the base table using the lookup table resulting in third intermediate result 408. Additionally, database system 500 includes union module 518 adapted for building a union of second intermediate result 404 and third intermediate result 408, defining final result 412 of the query.

Figure 6:
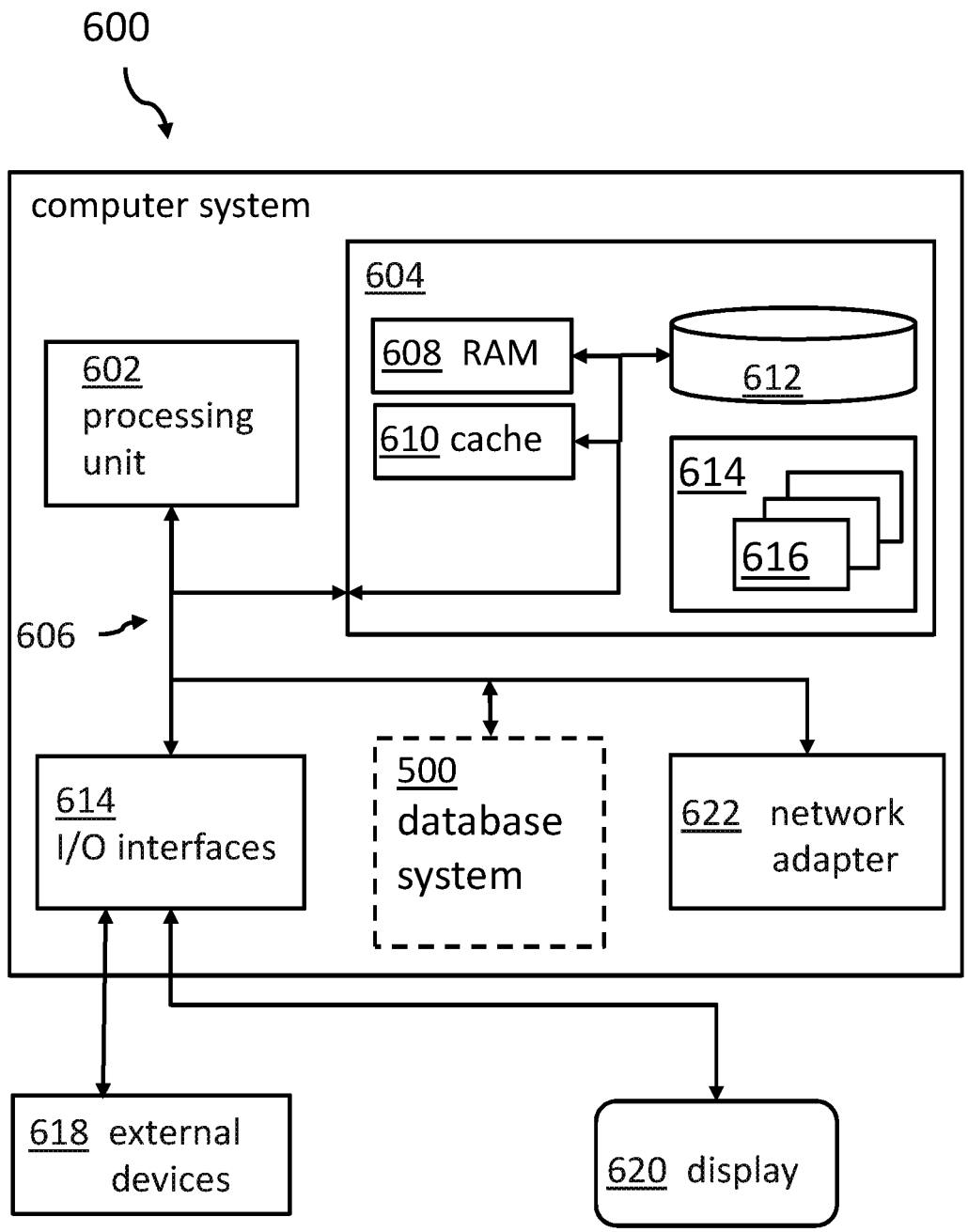
FIG. 6 is a block diagram of components of a computing device executing operations for optimizing query processing, in accordance with an embodiment of the present invention.

Embodiments of the invention may be implemented together with any type of computer, regardless of the platform being suitable for storing and/or executing program code. FIG. 6 is a block diagram of components of a computing device executing operations for optimizing query processing, in accordance with an embodiment of the present invention. FIG. 6 shows, as an example, computing system 600 suitable for executing program code related to the proposed method.

Computing system 600 is only one example of a suitable computer system and is not intended to suggest any limitation as to the scope of use or functionality of embodiments of the invention described herein. Regardless, computer system 600 is capable of being implemented and/or performing any of the functionality set forth hereinabove. In computer system 600, there are components, which are operational with numerous other general purpose or special purpose computing system environments or configurations. Examples of well-known computing systems, environments, and/or configurations that may be suitable for use with computer system/server 600 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 600 may be described in the general context of computer system-executable instructions, such as program modules, being executed by computer system 600. Generally, program modules may include routines, programs, objects, components, logic, data structures, and so on that perform particular tasks or implement particular abstract data types. Computer system/server 600 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 600 is shown in the form of a general-purpose computing device. The components of computer system/server 600 may include, but are not limited to, one or more processors or processing units 602, system memory 604, and bus 606 that couples various system components including system memory 604 to processor 602. Bus 606 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 600 typically includes a variety of computer system readable media. Such media may be any available media that is accessible by computer system/server 600, and it includes both, volatile and non-volatile media, removable and non-removable media.

System memory 604 may include computer system readable media in the form of volatile memory, such as random access memory (RAM) 608 and/or cache memory 610. Computer system/server 600 may further include other removable/non-removable, volatile/non-volatile computer system storage media. By way of example only, storage system 612 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 606 by one or more data media interfaces. As will be further depicted and described below, memory 604 may include at least one program product having a set (e.g., at least one) of program modules that are configured to carry out the functions of embodiments of the invention.

Program/utility 614, having a set (at least one) of program modules 616, may be stored in memory 604 by way of example, and not limitation, as well as an operating system, one or more application programs, other program modules, and program data. Each of the operating system, one or more application programs, other program modules, and program data or some combination thereof, may include an implementation of a networking environment. Program modules 616 generally carry out the functions and/or methodologies of embodiments of the invention as described herein.

Computer system/server 600 may also communicate with one or more external devices 618 such as a keyboard, a pointing device, a display 620, etc.; one or more devices that enable a user to interact with computer system/server 600; and/or any devices (e.g., network card, modem, etc.) that enable computer system/server 600 to communicate with one or more other computing devices. Such communication can occur via Input/Output (I/O) interfaces 614. Still yet, computer system/server 600 may communicate with one or more networks such as a local area network (LAN), a general wide area network (WAN), and/or a public network (e.g., the Internet) via network adapter 622. As depicted, network adapter 622 may communicate with the other components of computer system/server 600 via bus 606. It should be understood that although not shown, other hardware and/or software components could be used in conjunction with computer system/server 600. Examples, include, but are not limited to: microcode, device drivers, redundant processing units, external disk drive arrays, RAID systems, tape drives, and data archival storage systems, etc.

Additionally, database system 500 for optimizing query processing may be attached to bus system 606.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another device to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer implemented method, the method comprising:
    receiving, by one or more processors, an asynchronously updated index corresponding to a main dataset in a database system;
    receiving, by the one or more processors, time-sequenced log data of modifications made to the main dataset after a cutoff time of a last asynchronous index update, wherein the time-sequenced log data is read once by the database system for joining the main dataset with the time-sequenced log data and filtering out updated dataset entries and deleted dataset entries from the asynchronously updated index;

receiving, by the one or more processors, from an end user, a proximity-based query directed to the main dataset;

joining, by the one or more processors, the main dataset with the time-sequenced log data resulting in a first intermediate result comprising a first one or more entries of the main dataset made after the cutoff time;

processing, by the one or more processors, the proximity-based query to determine a second one or more entries satisfying the proximity-based query by emulating a function of the last asynchronous index update resulting in a second intermediate result, wherein the second intermediate result includes updated and deleted entries of a base table that are retrieved by the proximity-based query using an outdated asynchronously updated index, wherein the processing the proximity-based query further comprises receiving a staleness acceptability criterion; and determining, based at least in part on the staleness acceptability criterion, that one or more query results are acceptable;

filtering out, by the one or more processors, the updated dataset entries from the asynchronously updated index using the time-sequenced log data to generate a lookup table as index table;

processing, by the one or more processors, the proximity-based query against the main dataset using the lookup table resulting in a third intermediate result; and building, by the one or more processors, a union of the second intermediate result and the third intermediate result, to generate a final result of the proximity-based query.

2. The method of claim 1, wherein the database system is a relational database system.

3. The method of claim 2, wherein each dataset is a table of the relational database system.

4. The method of claim 1, wherein the asynchronously updated index is selected from the group consisting of a text search index, and an image index.

\* \* \* \* \*